Patented Nov. 13, 1951

2,575,135

UNITED STATES PATENT OFFICE 2,575,135

METAL MERCAPTIDES AS MODIFIERS IN EMULSION POLYMERIZATION

Walter A. Schulze and Willie W. Crouch, Bartlesville, Okla., assignors to Phillips Petroleum Company, a corporation of Delaware No Drawing. Application December 19, 1947, Serial No. 792,830

8 Claims. (Cl. 260—84.1)

This invention relates to the production of polymers of high molecular weight. It is particularly applicable to the production of synthetic rubber by the polymerization of polymerizable organic compounds in aqueous emulsion. In one of its more specific aspects the invention relates to the use of mercaptides as modifying agents in emulsion polymerization reactions. The invention also relates to a process for effecting polymerization reactions in emulsion systems whereby the quality of the polymerizates is greatly improved.

It is well known that polymers formed by emulsion copolymerization of butadiene and styrene, especially of the GR–S and similar types, are unsuited for conversion into most commercial products unless the emulsion polymerization is carried out in the presence of certain additive substances designated as modifying agents. The general function of modifiers is to eliminate, or substantially reduce, the formation between polymer units of cross linkages leading to the production of gel-type products, which render the polymerizates deficient in desirable rubber-like properties. Among the modifying agents heretofore employed, alkyl mercaptans of both primary and tertiary configuration have been widely used. However, when operating with these materials, certain difficulties are encountered. For example, mercaptans are oil-soluble (i. e. hydrocarbon-soluble) but comparatively insoluble in water and, when introduced into the reactor in the usual manner in admixture with the other ingredients, are present in the oil phase in such high concentrations during the early stages of the polymerization that overmodification often occurs, resulting in soft, low-molecular-weight polymers. As the reaction proceeds, however, the modifier is depleted and in many cases the amount remaining during the later stages of the reaction is very low. This condition leads to cross linking of polymer chains with the resultant formation of gel. Thus, while a product may appear to possess a desirable molecular weight, as evidenced by intrinsic viscosity determinations, there will be present material of both low and high molecular weights, representing a mixture of overmodified and undermodified polymer.

We have now found a method for carrying out emulsion polymerization reactions wherein gel-free polymers of high molecular weight and of uniform characteristics and easy processability may be obtained. The method comprises the inclusion in the polymerization recipe of a selected metal mercaptide of such nature that it has a definite, but limited, solubility in both the water and oil phases. Through the employment of such a compound, it is possible to maintain a constant concentration of dissolved modifier at the reaction locus during the entire polymerization period.

One object of this invention is to produce synthetic rubber.

Another object of our invention is to provide an improved process for the polymerization of a polymerizable organic material in an aqueous emulsion.

A further object of this invention is to provide a process whereby synthetic rubber of superior characteristics is produced.

Still another object of our invention is to obtain a more uniform modification of synthetic rubber produced by emulsion polymerization.

Other objects and advantages of our invention will become apparent, to one skilled in the art, from the accompanying disclosure and discussion.

The novel modifiers used in the practice of this invention comprise metal mercaptides which have limited solubility in both water and oil phases. The organic radicals are preferably comprised of alkyl groups, which may be primary, secondary, or tertiary, and which may contain from 8 to 16, inclusive, carbon atoms. The mercaptides most frequently preferred are those in which the alkyl groups contain from 12 to 16 carbon atoms, particularly the dodecyl, tetradecyl, and hexadecyl groups. In general the mercaptides which are applicable in this invention are those which correspond to the mercaptans which have been found to be outstanding as modifiers and promoters for polymerization reactions. However we have found that the mercaptides are superior to the mercaptans, as will be hereinafter set forth.

The polymers obtained according to our process are gel-free products of high molecular weight, which have high Mooney values, are easily processable, and when compounded and cured show superior tensile strength, resilience, and hysteresis properties. The Mooney values of these polymers decrease upon compounding, a fact which is unpredictable and which is of particular significance. When other polymerization methods are employed, the Mooney values ordinarily increase upon compounding the rubber and the increase may be taken as a measure of the processability, the samples showing only slight increases being preferred. High Mooney samples are generally difficult to process but when our method is employed high Mooney, easily processable rubbers result. In general when polymers of high molecular weight are prepared, cross linkage occurs as higher monomer conversions are reached, and a marked reduction in intrinsic viscosity is noted. When a suitable metal mercaptide is used as a modifier, instead of an alkyl mercaptan, the difficulty with cross linkage is obviated and long-chain polymers of uniform quality are readily produced. Through the use of the novel modifiers herein described, more nearly constant modification is realized throughout the course of the polymerization than has heretofore been possible. Since these modifiers have a limited solubility in both water and oil (hydrocarbon), a large percentage of the material is present in the polymerization system in the form of a finely divided solid dispersed throughout the reaction mixture in a readily available state. As polymerization progresses and the modifier is consumed, the dispersed material gradually dissolves, thus maintaining a low but constant concentration of modifier in solution. In this manner overmodification at the beginning of the reaction and undermodification at higher conversions are avoided.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1.3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene, (2-chloro-1,3-butadiene), bromoprene, methylchloroprene (2-chloro-3-methyl-1 3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene, and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and come within the term synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

When operating according to the method of this invention temperatures may range from about —30 to about 70° C., with temperatures from about 0 to about 50° C. usually preferred. Obviously, when polymerizations are carried out in aqueous emulsion in the absence of freezing point depressants, temperatures much below the freezing point of water cannot be employed. The use of various additive agents, however, makes a process of the type disclosed herein applicable at lower temperatures. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

When operating according to the method of this invention conventional polymerization procedures and catalysts are generally employed. For example, in one widely used process for butadiene-styrene copolymerizations, the comonomers are dispersed in water containing a suitable emulsifying agent such as soap, a polymerization catalyst such as potassium persulfate, and a modifier. The reactants are agitated at a predetermined temperature for the length of time required to effect the desired conversion after which the latex is treated with an antioxidant, coagulated, and dried. As hereinbefore stated, various alkyl mercaptans have been widely used as modifiers. In this invention modification is effected by means of selected mercaptides which are added to the system in the form of solid materials which are dispersed throughout the reaction mixture by any suitable agitating means. The mercaptide may be introduced into the system in various ways, among which may be mentioned dispersing it in the styrene or in the aqueous phase. Other materials which are widely used as catalysts for such aqueous polymerizations includes organic peroxides, redox compositions, etc.

If desired, blends of different mercaptides with one another, or blends of mercaptides with mercaptans, may be employed as modifiers in this invention, instead of a single mercaptide. As hereinbefore stated, the alkyl group in the mercaptide may contain from 8 to 16 carbon atoms, and this range is also applicable when a mercaptan is used in the modifier blends. Numerous variations in the modifiers may be introduced when blends of mercaptides with mercaptans are used. Any combination of mercaptide with mercaptan wherein the alkyl groups contain the same number of carbon atoms and are alike in structure, or the same number of carbon atoms but are different in structure, or even different numbers of carbon atoms, are applicable in this invention.

The amount of mercaptide employed to produce the desired modification is determined by a number of factors and is dependent upon the case at hand. For example, the molecular weight of the compound, and hence the amount required in a given recipe, is determined by the size of the alkyl group. Likewise, the extent of monomer conversion and the Mooney value desired are important points to be considered. The Mooney value is regulated by the amount of mercaptide used, and when polymerization is carried to high conversion more mercaptide is required than when the reaction is stopped at a lower level. When a mercaptide is used alone as a modifier, or a blend of mercaptides, the amount will usually vary in a range from about 0.1 to about 1.5 parts per 100 parts of monomers. When mercaptide-mercaptan blends are employed, the total modifier is adjusted to provide adequate modification in the particular system and the mercaptide is used in such quantity that gel formation is prevented.

The mercaptide modifiers used in the practice of this invention are applicable in substantially all emulsion polymerization recipes wherein mercaptans have heretofore been employed. For example, these modifiers may be used advantageously in recipes carried out in the presence of emulsifying agents such as fatty acid soaps, rosin soaps, and the like, and in the presence of any of various polymerization catalysts and initiators, such as ferricyanide-activated recipes, persulfate-catalyzed formulations, etc.

While the process of this invention has been described with particular reference to cadmium mercaptides as modifiers, other metal mercaptides of limited solubility in both oil and water, such as mercaptides of zinc, and mercury, from group II B of the periodic system, and also of lead and of silver, and the like, are applicable.

Advantages of this invention are illustrated by the following examples. The reactants, and their proportions, and the other specific ingredients of the recipes, are presented as being typical and should not be construed to limit the invention unduly.

*Example I*

A butadiene-styrene copolymerization was carried out in aqueous emulsion using cadmium tertiary dodecyl mercaptide as the modifier. The following recipe was employed:

| | Parts by weight |
|---|---|
| Butadiene | 72 |
| Styrene | 28 |
| Soap flakes | 5 |
| Potassium persulfate | 0.3 |
| Cadmium mercaptide | 0.15 |
| Water | 180 |

The mercaptide was finely pulverized and dispersed in the styrene. The polymerization ingredients were charged to a reactor and the mixture agitated at 50° C. for 8.5 hours. At the end of this period the conversion had reached 60.2 per cent. The reaction was shortstopped and the latex treated with an antioxidant after which it was coagulated and dried. The polymer had an intrinsic viscosity of 3.69, a Mooney value of 175.1, and was substantially gel free. After compounding the Mooney value decreased to 154.2. The sample was shown to be easy milling when judged on the basis of a control which was used as a standard.

Compounding of the polymer for evaluation was effected by use of the following recipe:

| | Parts by weight |
|---|---|
| Polymer | 100.0 |
| Carbon black[1] | 50.0 |
| Zinc oxide | 3.0 |
| Asphalt #6 (an asphalt softener) | 6.0 |
| Sulfur | 1.75 |
| Accelerator | 0.80 |
| Stearic acid | 2.0 |

[1] A furnace-type black having a high modulus.

A sample of the polymer was cured 30 minutes at 307° F. and evaluation data obtained. Corresponding tests were also made on a GR-S control. The results are tabulated below:

| | Mercaptide Modified Sample | GR-S Control |
|---|---|---|
| Tensile strength, p. s. i., 80° F | 3,170 | 2,600 |
| Tensile strength, oven aged 24 hrs./212° F | 2,900 | 2,065 |

Another sample of the polymer was cured 45 minutes at 307° F. and further tests made. Tests were again made on a GR-S sample which was used as a control. The following data were obtained:

| | Mercaptide Modified Sample | GR-S Control |
|---|---|---|
| ΔT, ° F.[1] | 59.5 | 83.5 |
| Resilience, per cent | 72.5 | 59.5 |
| ΔT, ° F., oven aged 24 hrs./212° F | 64.0 | 69.0 |
| Resilience, per cent, oven aged 24 hrs./212° F | 72.5 | 67.1 |

[1] Temperature rise as measured on Goodrich Flexometer.

*Example II*

A butadiene-styrene copolymer was prepared as in Example I except that 0.25 part cadmium tertiary dodecyl mercaptide was employed as the modifier instead of 0.15 part. Polymerization was allowed to continue for a period of 8.5 hours at which time the conversion had reached 58.6 per cent. A gel-free product with an intrinsic viscosity of 3.53 and a Mooney value of 142.3 was obtained. After compounding, according to the formula given in Example I, the Mooney value had decreased to 114.3. The product was rated as easy milling when judged on the basis of a GR-S control sample. Tensile strength at 80° F. was determined on a sample of the polymer which was cured 30 minutes at 307° F. The value (pounds per square inch) was 3425 in contrast to 2600 for the GR-S control. The oven aged sample (24 hours/212° F.) gave a value of 2795 in contrast to 2065 for the control. Hysteresis properties were recorded on a sample of the polymer cured 45 minutes at 307° F. The temperature rise as measured on a Goodrich Flexometer (ΔT,°F.) was 64.3 and the percent resilience was 70.4. The corresponding values for the GR-S control sample are given in Example I. When the same tests for hysteresis properties were made on a sample oven aged 24 hours/212° F., ΔT (°F) was 59.0 and the percent resilience was 74.6. These results were superior to those given by the GR-S control.

*Example III*

The procedure of Example I was repeated except that 0.45 part of cadmium tertiary dodecyl mercaptide was employed. At the end of a polymerization period of 8.5 hours the conversion had reached 57.7 percent. Intrinsic viscosity of the gel-free polymer was 2.38 and the Mooney value was 86.2. The product was compounded as in the preceding examples and the Mooney decreased to 78.6. The following tensile strength measurements were obtained upon evaluation of the compounded rubber which was cured 30 minutes at 307° F.:

Tensile strength, p. s. i., 80° F_____ 3110
Tensile strength, oven aged 24 hrs./212° F__ 2365

Hysteresis properties were studied after curing the rubber 45 minutes at 307° F. The results are tabulated below:

|  | Unaged Sample | Oven Aged 24 hrs./212° F. |
| --- | --- | --- |
| ΔT, °F | 72.4 | 64.0 |
| Resilience, per cent | 68.2 | 72.5 |

Corresponding results for a GR-S control are found in Example I. A sample of the rubber which was cured 30 minutes at 307° F. was tested for flex life and the value found to be 35,600 in contrast to 29,300 for a control sample.

*Example IV*

An easy milling, gel-free polymer was obtained by using 0.25 part cadmium tertiary dodecyl mercaptide as the modifier in the recipe of Example I and allowing the mixture to polymerize at 50° C. for 10 hours at the end of which time a 70.0 per cent conversion had been reached. The product had an intrinsic viscosity of 3.22 and a Mooney value of 150.3. After compounding the Mooney value decreased to 144.6. The tensile strength was determined at 80° F. on a sample cured 30 minutes at 307° F. and was found to be 3090 pounds per square inch while the same determination made on a sample oven aged 24 hours/212° F. gave the value 2970. Hysteresis properties were measured as before on samples cured 45 minutes at 307° F. and the following results obtained:

|  | Unaged Sample | Oven Aged 24 hrs./212° F. |
| --- | --- | --- |
| ΔT, °F | 66.7 | 63.0 |
| Resilience, per cent | 69.8 | 74.0 |

Example I shows corresponding results for a GR-S control.

*Example V*

A gel-free polymer possessing easy milling characteristics was obtained in a 10-hour reaction period at 50° C. using 0.45 part cadmium tertiary dodecyl mercaptide as the modifier in the recipe given in Example I. A 69.0 per cent conversion was reached. The product had an intrinsic viscosity of 3.06, a raw Mooney value of 111.7, and a compounded Mooney value of 91.1. The rubber was compounded as in the preceding examples and the tensile strength determined on a sample after a curing period of 30 minutes at 307° F. Values of 3210 and 3750 pounds per square inch were obtained at 80° F. and on the sample oven aged 24 hours/212° F., respectively. Another sample was cured 45 minutes at 307° F. and the hysteresis properties determined. The following results were obtained:

|  | Unaged Sample | Oven Aged 24 hrs./212° F. |
| --- | --- | --- |
| ΔT, °F | 69.7 | 66.0 |
| Resilience, per cent | 68.1 | 71.7 |

Results for a GR-S control are given in Example I.

*Example VI*

A polymer rated as very easy milling was prepared in a 10-hour polymerization period at 50° C. using 0.65 part cadmium tertiary dodecyl mercaptide as the modifier. The monomer conversion reached 67.0 per cent. The intrinsic viscosity of the product was 2.14, the raw Mooney value was 70.4, and the compounded Mooney value was 66.0. Tensile strength was determined after compounding the rubber and curing a sample 30 minutes at 307° F. The value at 80° F. was 2890 pounds per square inch while that on a sample oven aged 24 hours/212° F. was 2995. Another sample of the rubber was cured 45 minutes at 307° F. and the hysteresis properties determined. The results were as follows:

ΔT, °F _____ 79.4
Resilience, per cent _____ 63.2

A sample of the rubber which was cured 30 minutes at 307° F. was tested for flex life and the value found to be 35,400 as against 29,300 for a GR-S control.

*Example VII*

The copolymerization of butadiene and styrene, using 0.45 part cadmium tertiary dodecyl mercaptide as the modifier, was carried out over an 11 hour period according to the procedure given in Example I. The conversion was 73.7 per cent. The gel-free product had an intrinsic viscosity of 3.08, a raw Mooney value of 117.9, and a compounded Mooney of 105.6. The rubber was rated as easy milling. After compounding the product and curing a sample 30 minutes at 307° F., the tensile strength of 80° F. was 3350 pounds per square inch. A sample oven aged 24 hours/212° F. had a tensile strength of 3300. The following values were obtained for hysteresis properties determined on a sample cured 45 minutes at 307° F.:

|  | Unaged Sample | Oven Aged 24 hrs./212°F. |
| --- | --- | --- |
| ΔT, °F | 67.2 | 64.0 |
| Resilience, per cent | 69.0 | 73.0 |

Reference may be made to Example I for data on a GR-S control sample.

*Example VIII*

The recipe of Example I was employed for the preparation of a butadiene-styrene copolymer except that 0.65 part cadmium tertiary dodecyl mercaptide was employed instead of 0.15 part. The reaction was continued over an 11 hour period at a temperature of 50° C. and a conversion of 73.5 per cent was reached. The polymer which was gel free and easy milling, had an intrinsic viscosity of 2.59, a raw Mooney of 90.9, and a compounded Mooney of 76.3. A sample was compounded and cured 30 minutes at 307° F. and the tensile strength determined. At 80° F. the value was 3110 and the result on a sample oven aged 24 hours/212° F. was 2920 pounds per square inch. Hysteresis properties were determined on a sample cured 45 minutes at 307° F. Results of these tests are given below:

$\Delta T$, °F. ----------------------------------- 76.9
Resilience, per cent------------------------ 64.5

Data on a GR-S control sample are recorded in Example I.

A test for flex life was made on a sample which was cured 30 minutes at 307° F. The value obtained was 34,300 in contrast to 29,300 for a GR-S control.

*Example IX*

A butadiene-styrene copolymerization was carried out in aqueous emulsion using zinc tertiary dodecyl mercaptide as modifier. The following recipe was employed:

| | Parts by weight |
|---|---|
| Butadiene | 75 |
| Styrene | 25 |
| $K_2S_2O_8$ | 0.3 |
| Water | 80.0 |
| Soap flakes | 5.0 |
| Zn mercaptide | 0.35 |

The polymerization recipe was prepared and the polymerization was carried out under the conditions outlined in Example I. After 12 hours at 50° C. the conversion had reached 71.1%. The reaction was short-stopped and the latex treated with an antioxidant, after which it was coagulated and dried. The polymer had an intrinsic viscosity of 2.68 and was substantially gel-free.

As will be evident to those skilled in the art, various modifications of this invention can be made, or followed, in the light of the foregoing disclosure and discussion, without departing from the spirit or scope of the disclosure, or from the scope of the claims.

We claim:

1. In the production of synthetic rubber by the copolymerization of a monomeric material, comprising a major proportion of 1,3-butadiene and a minor proportion of styrene, in aqueous emulsion and in the presence of a soap emulsifying agent, the improvement which comprises conducting said polymerization in the presence of an added cadmium tertiary dodecyl mercaptide in an amount between .1 and 1.5 parts by weight per 100 parts of monomeric material.

2. In the production of synthetic rubber by the copolymerization of a monomeric material, comprising a major proportion of 1,3-butadiene and a minor proportion of styrene, in aqueous emulsion and in the presence of a soap emulsifying agent, the improvement which comprises conducting said polymerization in the presence of an added cadmium alkyl mercaptide, wherein said alkyl group contains at least 8 and not more than 16 carbon atoms, in an amount between .1 and 1.5 parts by weight per 100 parts of monomeric material.

3. In the polymerization of a monomeric material dispersed in an aqueous emulsion in the presence of a soap emulsifying agent and comprising a major proportion of an aliphatic conjugated diene to produce synthetic rubber, the improvement which comprises conducting said polymerization in the presence of an added metal alkyl mercaptide having at least 8 and not more than 16 carbon atoms per alkyl group and in which said metal is of the group consisting of silver, zinc, cadmium, mercury and lead, in an amount between 0.1 and 1.5 parts by weight per 100 parts of monomeric material.

4. The improvement of claim 3 in which said mercaptide is a mercaptide of cadmium.

5. The improvement of claim 3 in which said mercaptide is a mercaptide of zinc.

6. The improvement of claim 3 in which said mercaptide is a mercaptide of mercury.

7. An improved method of producing synthetic rubber, which comprises copolymerizing in aqueous emulsion a monomeric material comprising a major amount of 1,3-butadiene and a minor amount of styrene in the presence of potassium persulfate as a polymerization catalyst in the presence of a soap emulsifying agent, and adding to said aqueous emulsion a cadmium tertiary dodecyl mercaptide in an amount between 0.1 and 1.5 parts per 100 parts by weight of said monomeric material, as a polymerization modifier.

8. In a method of producing synthetic rubber by copolymerizing in aqueous emulsion a monomeric material comprising a major amount of 1,3-butadiene and a minor amount of styrene in the presence of potassium persulfate as polymerization catalyst in the presence of a soap emulsifying agent, an improvement which comprises adding to such an aqueous emulsion as a polymerization modifier a cadmium alkyl mercaptide having at least eight and not more than sixteen carbon atoms per alkyl group in an amount between 0.1 and 1.5 parts per 100 parts by weight of said monomeric material.

WALTER A. SCHULZE.
WILLIE W. CROUCH.

REFERENCES CITED

The following references are of record in the file of this patent:

UNITED STATES PATENTS

| Number | Name | Date |
|---|---|---|
| 2,380,475 | Stewart | July 31, 1945 |
| 2,388,515 | Zwicker et al. | Nov. 6, 1945 |
| 2,394,406 | Schoenfeld | Feb. 5, 1946 |
| 2,416,461 | Stewart | Feb. 25, 1947 |
| 2,444,643 | Fryling | July 6, 1948 |

OTHER REFERENCES

Schubert, J. American Chem. Soc., Oct. 1932, vol. 54, pp. 4077 to 4085.

Kalichevsky et al., Chemical Refining of Petroleum (Revised), Reinhold, 1942, page 230.